Nov. 23, 1937.  R. E. KING  2,100,220
SHAFT SEAL
Filed Oct. 24, 1936
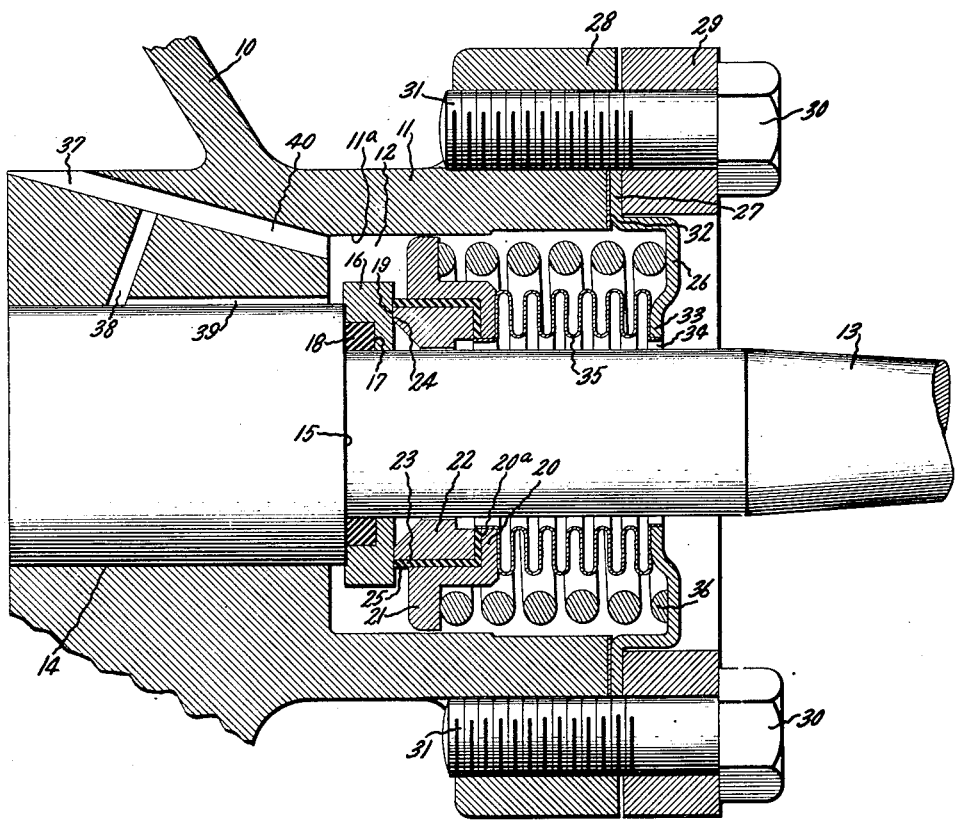
Inventor:
Ralph E. King,
by Harry E. Dunham
His Attorney.

Patented Nov. 23, 1937

2,100,220

UNITED STATES PATENT OFFICE 2,100,220

SHAFT SEAL

Ralph E. King, Fort Wayne, Ind., assignor to General Electric Company, a corporation of New York Application October 24, 1936, Serial No. 107,434

3 Claims. (Cl. 286—11)

My invention relates to shaft seals, such as used for refrigerant compressors or the like.

Compressors designed for use in refrigerating apparatus or the like are frequently driven by an electric motor connected to a suitable compressor drive shaft which extends through an aperture provided in the compressor casing. Since the compressor casing contains refrigerant vapor or other fluids, it is necessary to provide some sealing arrangement to prevent the escape of fluid from the casing through the drive shaft aperture therein. One form of sealing arrangement which has been proposed for this purpose includes a bellows surrounding the shaft and secured at one end to the compressor casing. The other end of the bellows carries a rubber sealing ring which is pressed by a compression spring against a shoulder formed on the shaft. Difficulty has been encountered, however, in the operation of compressors provided with shaft sealing arrangements of the type described due to the fact that the rubber sealing rings employed become distorted out of shape by the force exerted thereon by the compression springs. Furthermore, the ordinary lubricants and refrigerants employed in refrigerating compressors rapidly deteriorate the rubber sealing rings, resulting in leakage of fluid from the compressor casing.

Accordingly, it is an object of my invention to provide an improved shaft sealing arrangement including a resilient seal between the relatively rotating sealing elements which is not distorted out of shape, nor deteriorated by contact with ordinary lubricants and refrigerants employed in refrigerant compressors in operation.

It is a further object of my invention to provide an improved shaft sealing arrangement including a resilient sealing ring and a member having a relatively rigid bearing face adapted to relieve the resilient sealing ring of excessive forces tending to distort the same.

Further objects and advantages of my invention will become apparent as the following description proceeds, and the features of novelty which characterize my invention will be pointed out with particularity in the claims annexed to and forming a part of this specification.

For a better understanding of my invention reference may be had to the accompanying drawing, the single figure of which is a fragmentary sectional view of a portion of a refrigerant compressor provided with a shaft sealing arrangement embodying my invention.

Referring now to the drawing, I have shown a portion of a refrigerant compressor casing 10 provided with a boss 11 which is counter-bored at 11a to define a chamber 12 therein. A drive shaft 13 is journaled in a bearing 14 in the compressor casing which communicates between the interior of the compressor casing and the chamber 12, the drive shaft being coaxial with the counter-bore 11a. The drive shaft 13 is of reduced diameter near its outer end, and is provided with a shoulder 15 slightly beyond the outer face of the bearing 14 and within the chamber 12. The outer end of the drive shaft 13 of reduced diameter extends through the chamber 12 to the outside of the compressor casing and is driven by a suitable source of power such, for example, as an electric motor. The inner end of the drive shaft 13 extends into the interior of the compressor casing and drives the compressor mechanism housed therein in any suitable manner.

During the operation of the compressor, gaseous refrigerant tends to leak from the interior of the compressor casing 10 along the drive shaft 13 into the chamber 12 and out into the atmosphere.

Accordingly, I have provided a sealing arrangement for preventing the escape of gaseous refrigerant and other fluids from the interior of the casing 10 preferably comprising a removable collar 16 mounted on the drive shaft 13 in abutting relation to the shoulder 15 thereon. The removable collar 16 is substantially L-shaped in cross section and is provided with an annular recess 17 extending about the inner side thereof and open to the drive shaft 13. An annular ring 18 of resilient material is positioned under compression in the recess 17, which forms a seal between the drive shaft 13 and the collar 16 and prevents relative rotation therebetween. The resilient ring 18 also provides for convenient removal or replacement of the collar 16. The removable collar 16 is also provided with a polished transverse outer sealing surface 19. The resilient ring 18 preferably comprises polymerized chloro-2-butadiene-1,3 with a filler material and is subject to expansion of about 8% and less than 10% by volume when saturated with lubricating oil. Polymerized chloro-2-butadiene-1,3 is obtainable on the market under the trade name "Duprene" which ordinarily has various suitable fillers compounded therewith.

An annular supporting collar 20 is arranged in the chamber 12 and surrounds the drive shaft 13 in spaced relationship thereto. The supporting collar 20 is provided with an annular recess 20a in the face thereof adjacent the removable collar 16 and open to the drive shaft 13, and a peripheral flange 21 thereabout. A rigid ring or member 22 is positioned in the recess 20a and a resilient annulus or member 23 having a bottom wall forming a cup is interposed in the recess 20a between the ring 22 and the supporting collar 20. The ring 22 is provided with a polished bearing and sealing face 24 which engages the sealing surface 19 of the removable collar 16, and carries a major portion of the thrust between the supporting collar 20 and the removable collar 16. An arrangement including a portion of the resilient annulus 23 held in compression between the ring 22 and the supporting collar 20 is provided for sealing the ring 22 to the supporting collar 20 and for yieldably mounting the ring 22 in the recess 20a to accommodate aligning movements of the ring 22 with respect to the sealing surface 19 of the removable collar 16. Also the resilient annulus 23 is provided with a sealing face 25 which engages the sealing surface 19 of the removable collar 16, thereby forming a main seal between the supporting collar 20 and the removable collar 16. The sealing face 24 is uninterrupted and serves as an auxiliary seal between the supporting collar 20 and the removable collar 16, in addition to carrying a major portion of the thrust between these elements. Preferably, the resilient annulus 23 comprises polymerized chloro-2-butadiene-1,3 as hereinbefore described.

In the open end of chamber 12 there is provided a disk 26 having an inwardly flared outer peripheral flange 27 removably secured in sealed relationship with an annular flange 28 provided about the outer end of the boss 11. The peripheral flange 27 of the disk 26 is secured in place by an end ring 29 fastened to the flange 28 by cap screws 30 having threaded ends 31. A suitable gasket 32 is interposed between the flange 28 and the flange 27 in order to tightly seal the disk 26 to the boss 11. The disk 26 is also provided with an inwardly flared central portion 33 having a central opening 34 therein surrounding the drive shaft 13 in spaced relation thereto. An imperforate resilient metallic bellows 35 extends between the supporting ring 20 and the disk 26. The opposite ends of the bellows 35 are soldered or otherwise hermetically sealed to the adjacent portions of the supporting collar 20 and the disk 26, respectively. The bellows 35 thus forms a seal between the supporting collar 20 and the disk 26. The supporting collar 20, the ring 22, and the annulus 23 thus comprise a stationary element of the sealing arrangement.

A helical compression spring 36 surrounds the bellows 35 and extends between the peripheral flange 21 of the supporting collar 20 and the intermediate portion of the disk 26 lying between the peripheral flange 27 and the central portion 33 thereof. This helical spring firmly presses the ring 22 in bearing and sealing engagement with the removable collar 16, and presses the annulus 23 in sealing engagement with the removable collar 16. Thus the ring 22 prevents the spring 36 from crushing the resilient annulus 23 and serves as an auxiliary seal between the supporting collar 20 and the removable collar 16.

In the operation of the compressor, the lubricant contained within the compressor casing 10 is thrown into a recess 37 formed in the top of the bearing 14 by the compressor mechanism housed within the casing 10. This lubricant passes through a passage 38 to the contacting surfaces of the drive shaft 13 and the bearing 14 to lubricate the same. A portion of this lubricant also flows along the drive shaft 13 through a longitudinal groove 39 formed in the bearing 14 and enters the interior of the chamber 12. Lubricant also flows from the recess 37 through a passage 40 into the chamber 12. The lubricant thus entering the interior of the chamber 12 lubricates the sealing surface 19 of the removable collar 16, the bearing face 24 of the ring 22, and the sealing face 25 of the resilient annulus 23. It will be observed that a considerable amount of lubricant will be trapped and retained in the chamber 12, providing a seal of the flooded type. The lubricant contained in the chamber 12 will come in contact with the resilient ring 18 and the resilient annulus 23 contained therein. Ordinary rubber will increase in volume from 100 to 200% when saturated with lubricating oil. Consequently, I prefer that the resilient ring 18 and the resilient annulus 23 comprise polymerized chloro-2-butadiene-1,3 since such material increases in volume less than 10% when saturated with lubricating oil, and is not appreciably deteriorated by contact therewith.

It will thus be seen that I have provided a simple and effective arrangement for sealing the shaft aperture of a compressor casing comprising a resilient sealing member which is not distorted out of shape, nor deteriorated by contact with ordinary lubricants and refrigerants employed in the refrigerant compressor in operation.

While I have shown a particular embodiment of my invention in connection with a refrigerating machine, I do not desire my invention to be limited to the construction shown and described, and I intend in the appended claims to cover all modifications within the spirit and scope of my invention.

What I claim as new and desire to secure by Letters Patent of the United States is:

1. A shaft seal comprising a casing provided with a shaft aperture, a rotatable shaft extending through said aperture and provided with a transverse sealing surface, a supporting collar provided with a recess therein, a resilient annulus positioned in said recess and having a sealing face engaging said sealing surface, a rigid ring positioned in said recess adjacent said resilient annulus and having a sealing face engaging said sealing surface, means including a portion of said resilient annulus interposed between said rigid ring and said supporting collar for sealing said rigid ring to said supporting collar and for yieldably mounting said rigid ring in said recess to accommodate aligning movements thereof with respect to said sealing surface, means including a spring for pressing said resilient annulus and said rigid ring in sealing engagement with said sealing surface, said rigid ring being arranged to carry a major portion of the thrust upon said sealing surface, and means including an imperforate resilient bellows extending between said supporting collar and said casing for sealing said supporting collar to said casing.

2. A shaft seal comprising a casing provided with a shaft aperture, a drive shaft extending through said aperture and provided with a transverse sealing surface, a supporting collar provided with a recess therein, a resilient annulus comprising polymerized chloro-2-butadiene-1,3 positioned in said recess and having a sealing face engaging said sealing surface, a rigid ring positioned in said recess and having a sealing face engaging said sealing surface, means including a portion of said resilient annulus interposed between said rigid ring and said supporting collar for sealing said rigid ring to said supporting collar and for yieldably mounting said rigid ring in said recess to accommodate aligning movements thereof with respect to said sealing surface, means including a spring for pressing said resilient annulus and said rigid ring in sealing engagement with said sealing surface, said rigid ring being arranged to carry a major portion of the thrust upon said sealing surface, and means including an imperforate resilient bellows extending between said supporting collar and said casing for sealing said supporting collar to said casing.

3. A shaft seal comprising a casing provided with a shaft aperture, a rotatable shaft extending through said aperture and provided with a transverse sealing surface, a supporting collar surrounding said rotatable shaft and having an annular recess therein adjacent said sealing surface and open to said rotatable shaft, a resilient cup-shaped member positioned in said recess and having a sealing face engaging said sealing surface, a rigid ring positioned in said cup-shaped member adjacent said rotatable shaft and in spaced relation therewith and having a sealing face engaging said sealing surface, means including said cup-shaped member for sealing said rigid ring to said supporting collar and for yieldably mounting said rigid ring in said recess to accommodate aligning movements thereof with respect to said sealing surface, means including a spring engaging said supporting collar for pressing said resilient cup-shaped member and said rigid ring in sealing engagement with said sealing surface, said rigid ring being arranged to carry a major portion of the thrust upon said sealing surface, and means including an imperforate resilient bellows extending between said supporting collar and said casing for sealing said supporting collar to said casing.

RALPH E. KING.